(12) United States Patent
Giacobbe et al.

(10) Patent No.: US 7,733,894 B1
(45) Date of Patent: Jun. 8, 2010

(54) DYNAMIC QUEUE MANAGEMENT

(75) Inventors: Paul J. Giacobbe, Townsend, MA (US); John C. Carney, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1006 days.

(21) Appl. No.: 11/302,332

(22) Filed: Dec. 14, 2005

(51) Int. Cl.
*H04L 12/28* (2006.01)
*H04L 12/56* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*G06F 17/00* (2006.01)
*G06F 13/00* (2006.01)
*G06F 13/28* (2006.01)

(52) U.S. Cl. ............... 370/415; 370/230; 707/101; 711/171

(58) Field of Classification Search ............... 370/412
See application file for complete search history.

(56) References Cited

U.S. PATENT DOCUMENTS

| 5,335,224 | A * | 8/1994 | Cole et al. ............... 370/235 |
| 6,829,217 | B1 * | 12/2004 | Bechtolsheim et al. ...... 370/229 |
| 2002/0131421 | A1 * | 9/2002 | Reshef et al. ......... 370/395.72 |
| 2005/0073956 | A1 * | 4/2005 | Moores et al. ............ 370/235 |
| 2006/0098584 | A1 * | 5/2006 | Kyusojin ................. 370/252 |

* cited by examiner

*Primary Examiner*—William Trost, IV
*Assistant Examiner*—Andrew Chriss
(74) *Attorney, Agent, or Firm*—Harrity & Harrity, LLP

(57) ABSTRACT

A method may include receiving a data unit and identifying a state of a memory storing data units. The method may include selecting a threshold value having a first threshold unit or a second threshold unit based on the state of the memory. The method may include comparing the threshold value to a queue state using the first threshold unit if the memory is in a first state. The method may include comparing the threshold value to the queue state using the second threshold unit if the memory is in a second state.

30 Claims, 4 Drawing Sheets

| THRESHOLD | UNIT |
|---|---|
| 1,000 | BYTES |
| 5,000 | BYTES |
| 10,000 | BYTES |
| 15,000 | BYTES |
| 15 | BUFFERS |
| 200 | BUFFERS |
| 900 | BUFFERS |

FIG. 3

DYNAMIC QUEUE MANAGEMENT

FIELD OF THE INVENTION

Implementations consistent with the principles of the invention relate generally to network communication and, more particularly, to techniques for sharing memory across a number of queues.

BACKGROUND

Network devices, such as routers, may employ a memory and a number of queues. The queues may be associated with, for example, receiving traffic from a network or making traffic available to a network. In certain implementations, there may be a large number of queues sharing a common memory. In these implementations, the memory may be insufficient to meet the storage needs of all of the queues operating on the device if the queues are operating at, or near, capacity, such as near maximum fill rates. Assume that a network device has a memory that is 15 megabytes (Mbytes) in size. Further assume that this memory is shared across ten queues each having a size of 2 Mbytes. If all of the queues attempt to operate near maximum fill rates (2 Mbytes/queue), the 15 Mbyte memory will be incapable of meeting the approximately 20 Mbyte (10 queues×2 Mbyte/queue) storage requirements for the ten queues. If a memory cannot meet the storage needs of some, or all, of the queues, packets may be dropped.

Network devices having insufficient memory to service the demands of queues may attempt to manage memory so that each queue is treated fairly with respect to the other queues. Fair treatment of queues may reduce the chances that a queue is treated unfairly, such as by dropping a disproportionate number of packets associated with the queue. Queue and/or memory management techniques may use thresholds and a single unit of queue management, such as a buffer. Buffers may be used to store data units associated with queues. The threshold may be used to allocate buffers to queues in a manner that attempts to maintain parity across the queues. Managing queues using buffers may be inefficient if incoming data units are smaller in size than a buffer. For example, if a buffer is 128 bytes in size and an incoming packet is 40 bytes in size, the packet may be allocated 128 bytes of memory when placed in a queue since a 128 byte buffer is the increment used for operating with queues. If a queue is receiving large numbers of small packets, the queue may be deprived of additional buffers as the queue nears the threshold even though the actual number of bytes stored in the queue may not be very large relative to the capacity of the queue.

Memory management in network devices may benefit from techniques that dynamically adjust queue management units based on a number of queues in operation, the state of operating queues, thresholds associated with queues, and/or other parameters, such as congestion, packet priorities, queue profiles, etc.

SUMMARY

In accordance with an aspect, a device is provided. The device may include a first memory configured to store data units. The device may include a second memory configured to store a first threshold value and a first unit of measure, and to store a second threshold value and a second unit of measure. The device may include logic configured to determine a state of the first memory. The logic may select the first threshold value and the first unit of measure or the second threshold value and the second unit of measure based on the state of the first memory. The logic may compare the first threshold value to a state of a queue using the first unit of measure when the first threshold value is selected. The logic may store a data unit if the first threshold value is greater than the queue state and the first threshold value is selected. The logic may compare the second threshold value to the state of the queue using the second unit of measure when the second threshold value is selected. The logic may store the data unit if the second threshold value is greater than the queue state and the second threshold value is selected.

In accordance with another aspect, a device is provided. The device may include a first memory configured to store data units. The device may include a table that includes a first entry, where the first entry includes a first threshold value and a first threshold unit. The device may include a second entry. The second entry may include a second threshold value and a second threshold unit. The device may include first logic configured to identify a state of the first memory and generate a value representing the state of the first memory. The logic may use the first entry when the value represents a first state of the first memory. The logic may use the second entry when the value represents a second state of the first memory, wherein the second state corresponds to a more full state than the first state.

In accordance with yet another aspect, a method is provided. The method may include receiving a data unit and identifying a state of a memory storing data units. The method may include selecting a threshold value having a first threshold unit or a second threshold unit based on the state of the memory. The method may include comparing the threshold value to a queue state using the first threshold unit if the memory is in a first state. The method may include comparing the threshold value to the queue state using the second threshold unit if the memory is in a second state.

In accordance with still another aspect, a device is provided. The device may include means for receiving a data unit and means for identifying a state of a memory storing data units. The device may include means for selecting a threshold value based on the memory state. The device may include means for associating a first threshold unit or a second threshold unit with the threshold value based on the memory state. The device may include means for comparing the threshold value to a queue fill level using the first unit or the second unit. The device may include means for placing the data unit on the queue if the queue fill level is less than the threshold value.

BRIEF DESCRIPTION OF THE DRAWINGS

The accompanying drawings, which are incorporated in and constitute a part of this specification, illustrate implementations of the invention and, together with the description, explain the invention. In the drawings.

FIG. 3 illustrates an exemplary data structure that can be used to associate a threshold with a queue management unit according to an implementation consistent with the principles of the invention.

DETAILED DESCRIPTION

Figure 1:
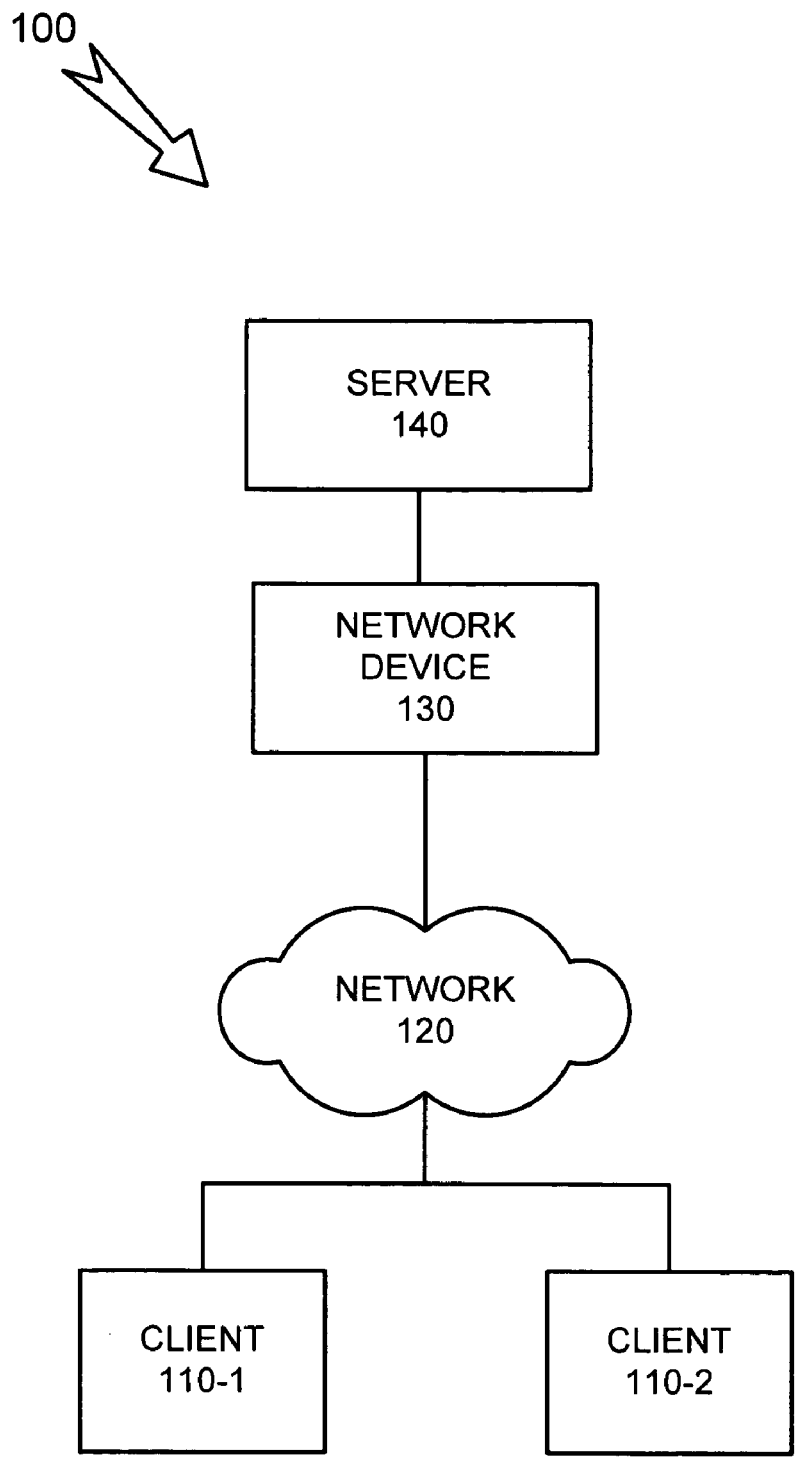
FIG. 1 is a diagram of an exemplary network in which systems and methods consistent with the principles of the invention may be implemented.

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Exemplary implementations consistent with principles of the invention facilitate the management of memory shared by a number of queues. The memory is managed in a way that maintains fairness among queues sharing the memory. For example, a group of queues may share a common pool of memory that is not large enough to provide all of the queues with large allocations of memory. It may be beneficial to manage these queues using a first unit of storage (e.g., a byte) when the queues and/or memory are lightly loaded and/or to manage the queues using a second unit of storage (e.g., a buffer) when the queues and/or memory are more heavily loaded. The first unit and second unit may be configured to help maintain fairness regarding memory allocations across the queues for given usage demands placed on the memory.

Assume that a memory is lightly loaded. It may be advantageous to manage queues in units of bytes so that fill rates associated with the queues can be monitored using more accurate units, i.e., units that provide for fine increments of measure with respect to memory consumption and/or queue fill rates. If the memory becomes more heavily loaded, such as might occur when all of the memory is at risk of being consumed, it may be beneficial to manage the queues using a coarser unit of resolution, such as buffers. The coarse unit of measure may sacrifice some accuracy with respect to monitoring the memory and/or fill rates of queues. However, the coarse units may allow the queues to be treated more fairly in situations where available memory may be at a premium, such as at times of heavy queue use and/or queue congestion. In addition, managing queues using buffers may be computationally less intensive than managing queues using bytes, thus managing queues via buffers at times of high memory consumption may be desirable.

Implementations may dynamically manage memory by varying queue management units according to thresholds associated with queues operating on a network device. The thresholds may take into account an overall usage of global memory serving the queues and/or may take into account characteristics of the queues, such as queue fill levels, congestions, queue priorities, etc. Implementations may apply a single threshold across all queues, or may apply different thresholds to different queues. Implementations may use a register, such as a meter register, to monitor consumption of memory. The meter register (hereinafter meter) may be configured to select thresholds and/or queue management units based on a state of the memory. The meter may dynamically select threshold values and/or threshold units used to manage queues based on a state of the memory. Implementations may use multiple meters that share a common memory for monitoring and/or managing queues operating on a network device.

A "data unit," as used herein, may refer to any type of machine-readable data having substantially any format that may be adapted for use in one or more networks, such as a public network and/or private network. A data unit may include packet data and/or non-packet data.

First Exemplary Implementation

FIG. 1 is a diagram of an exemplary network 100 in which systems and methods consistent with the principles of the invention may be implemented. Network 100 may include, among other things, a client 110-1 and 110-2 (hereinafter, collectively client 110), a network 120, a network device 130, and a server 140. While network 100 is shown to include a particular number and arrangement of elements, network 100 may include fewer, more, different, or differently arranged elements in other implementations consistent with the principles of the invention. In addition, network 100 may include the illustrated elements, and other elements, in alternative configurations consistent with the principles of the invention. For example, network device 130 may be located between client 110 and network 120.

Client 110 may include a device configured to make a data unit available to a network and/or to receive a data unit from a network. Client 110 may be associated with a person, such as a user. For example, client 110-1 and 110-2 may represent subscribers of communication services provided by server 140. Client 110 may include a desktop computer, a laptop computer, a personal digital assistant (PDA), a web enabled cellular telephone, a wireless fidelity (Wi-Fi) device, or an application specific processing device that is operated by a user to communicate with a destination device, such as server 140. Client 110 may communicate with other devices, such as other clients, network device 130 and/or server 140, by sending, for example, data units, such as packets.

Network 120 may include a network, or combination of networks, capable of transporting data units. For example, network 120 may include a local area network (LAN), a metropolitan network (MAN), or a wide area network (WAN), such as the Internet. Network 120 may include hard-wired connections, such as shielded twisted pairs, coaxial cables, optical fibers, and/or waveguides. Alternatively, network 120 may include wireless links, such as free space optical links, and/or free space acoustic links. Network 120 may operate using substantially any protocol, such as asynchronous transfer mode (ATM), synchronous optical transport (Sonet), Internet Protocol (IP), public switched telephone network (PSTN), or Bluetooth.

Network device 130 may include a device capable of receiving a data unit via a network. In one implementation, network device 130 may include an in-line device operating as an edge device between a first network and a destination device that may be operating on a second network. For example, network device 130 may operate as an edge device between an untrusted network, such as the Internet, and a trusted network, such as a corporate LAN. "Inline network device" may refer to any network device operating in a manner whereby all, or substantially all, data units intended for a destination device pass through the network device before reaching the destination device. Network device 130 may include devices such as routers, gateways, firewalls, switches, and/or servers. For example, network device 130 may operate as a router in cooperation with server 140 to provide communication services to a number of subscribers, such as client 110.

Server 140 may include a device capable of receiving a data unit from another device or from a network. For example, server 140 may include a workstation, desktop computer, laptop computer, PDA, web enabled cellular telephone, Wi-Fi device, or an application specific processing device. In exemplary implementations described herein, server 140 may operate as a destination device by receiving one or more data units from client 110 via an intermediate device, such as network device 130. For example, server 140 may provide a service to other devices on network 100, such as client 110.

Client 110 may communicate with network device 130 and/or server 140 using connections associated with a primary data network, such as network 120. Alternatively, client 110 may communicate with network device 130 and/or server 140 using a dedicated network and/or link. A link may be a dedicated physical or virtual link and may include encryption protocols for protecting the content of communications between client 110 and a destination device, such as network device 130 and/or server 140.

Exemplary Functional Diagram

Figure 2:
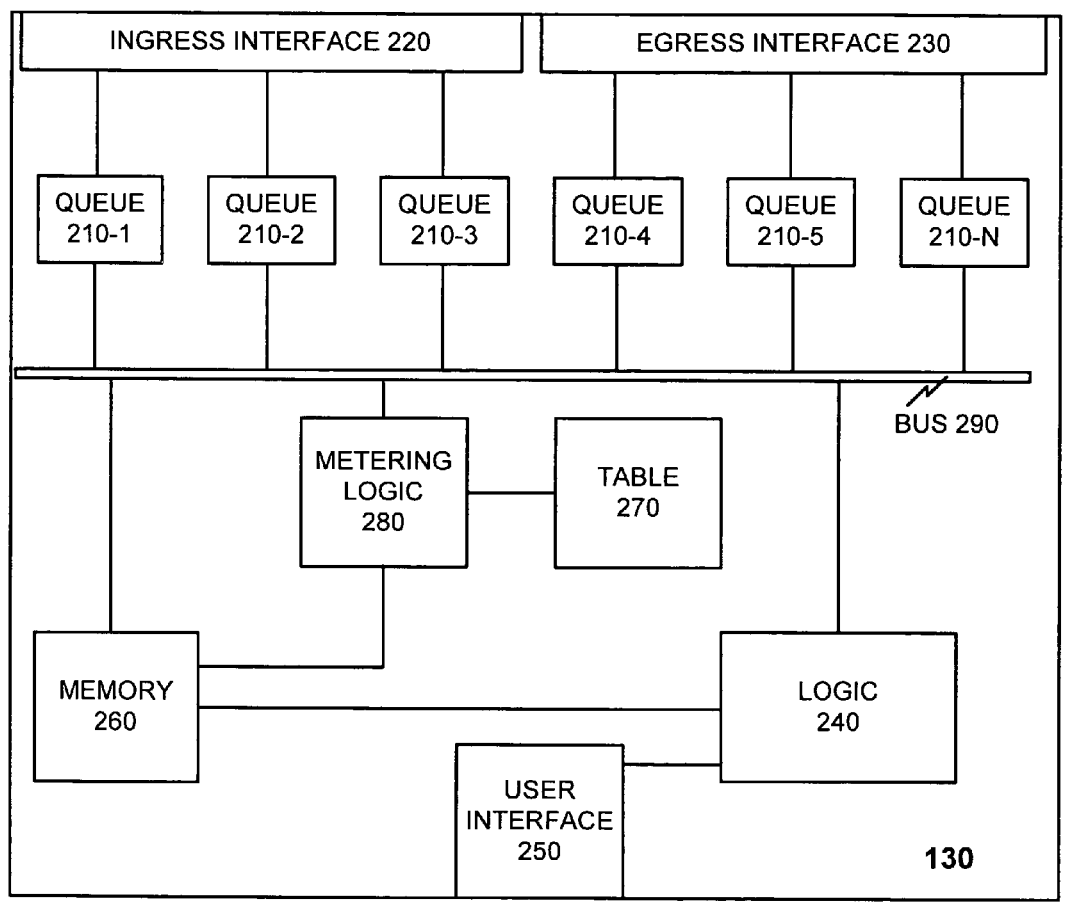
FIG. 2 illustrates an exemplary functional block diagram of network device 130 of FIG. 1 according to an implementation consistent with the principles of the invention.

FIG. 2 illustrates an exemplary functional block diagram of network device 130 of FIG. 1 according to an implementation consistent with the principles of the invention. Network device 130 may include queues 210-1 to 210-N (hereinafter collectively queue(s) 210), ingress interface 220, egress interface 230, logic 240, user interface 250, memory 260, table 270, metering logic 280, and bus 290.

Queue 210 may include a device capable of holding a data unit that is received from, or can be made available to, ingress interface 220, egress interface 230, logic 240, and/or memory 260. For example, queues 210-1 to 210-3 may operate as registers that receive data units from ingress interface 220. Queues 210-1 to 210-3 may store received data units until the data units are made available to another device, such as logic 240. Logic 240 may operate on the received data units to produce processed data units. A processed data unit may be a data unit that has had an operation performed thereon by a device, such as logic 240. For example, processing data units may include manipulating information included in the data unit, formatting the data unit, and/or encapsulating the data unit. Processed data units may be provided to queues 210-4 to 210-N that may be associated with egress interface 230. Queues 210-4 to 210-N may make processed data units available to egress interface 230 so that the processed data units can be made available to a destination device, such as server 140 or client 110.

Queues 210-1 to 210-N may each have a size associated therewith. For example, each queue 210 may have a size that can be represented in Mbytes and/or buffers. In addition, each queue 210 may be configured to operate with a queue storage unit. Queue storage units may have particular sizes depending on parameters associated with queue 210. For example, queue storage units may include bits, bytes, buffers, blocks and/or cells. Incoming data units may be stored using a queue storage unit and/or operations, such as evaluating a queue state, may be performed using a queue storage unit. For example, a fill level or queue threshold can be determined in queue storage units of bits, bytes, buffers, etc. Queues 210 can also be identified and/or segregated based on characteristics such as priorities (such as high, medium, or low), types of traffic (such as voice, video, data, and control), colors of data units (such as red, yellow, and green), etc.

Incoming and/or outgoing data units associated with queue 210 may have a size associated therewith. Queue 210 may be configured so that it can receive data units until a threshold is reached. For example, a queue having a size of 1 Mbyte may have a threshold set at 0.9 Mbyte for a particular configuration, application, queue loading scenario, etc. Queue 210 may be allowed to receive data units of any size until the threshold value is reached. When the threshold value is reached, data units may be dropped, i.e., not placed on queue 210.

Threshold values associated with queues may change based on parameters associated with network device 130. For example, in one implementation queue 210 may have a first threshold value when memory 260 is operating at a first state, i.e. memory 260 has a first amount of available (unused) memory. Queue 210 may have a second threshold value when memory 260 is operating at a second state, i.e., memory 260 has a second amount of available memory that may be less than the first amount of available memory.

Threshold values for queue 210 may be specified by a system, such as network device 130, and/or an operator. Threshold values used with implementations of the invention may be represented in substantially any type and/or number of units, such as bits, bytes, buffers, etc. The units associated with threshold values may vary based on a condition of memory 260, operating parameters of network device 130, parameters of network 100, etc. For example, a queue, such as queue 210-1, may have a threshold value specified in bytes when memory 260 is in a first state. The same queue, queue 210-1, may have as second threshold value that is specified in buffers when memory 260 is in a second state. In addition, a first queue may have one threshold and another queue may have another threshold based on a state of memory 260.

Ingress interface 220 and egress interface 230 may, respectively, include a device configured to receive and/or send data units. Interfaces 220/230 may include any transceiver-like mechanism that enables network device 130 to communicate with other devices and/or systems. For example, interfaces 220/230 may include a modem, an Ethernet interface to a LAN, a wireless transceiver for coupling a wireless network device 130 to network 120, client 110, an input/output interface associated with server 140, an input/output interface associated with network 120, etc.

Logic 240 may include any type of processing logic that may interpret and execute instructions. Logic 240 may be implemented in a standalone or distributed configuration. Implementations of logic 240 may be hardwired logic, such as application specific integrated circuits (ASICs), field programmable gate arrays (FPGAs), etc. based on desired configurations of network device 130. Logic 240 may operate to control the operation of queues 210, interfaces 220/230, memory 260, metering logic 280 and/or user interface 250. For example, logic 240 may instruct metering logic 280 to determine a state of memory 260 (e.g., an amount of available memory) and to select a threshold value and/or threshold unit based on the determined state of memory 260.

User interface 250 may include one or more interfaces, components, or mechanisms that permit a user to input information to network device 130. User interface 250 may include a keyboard, a mouse, a pen, voice recognition and/or biometric mechanisms, etc. User interface 250 may also include one or more mechanisms that output information to, for example, a user. For example, user interface 250 may include a display, a printer, one or more speakers, etc.

Memory 260 may include a static and/or dynamic storage device that may store information and instructions for execution by logic 240 and/or for use by other devices operating in network device 130. For example, an implementation of memory 260 may store data units operating in conjunction with network device 130. Memory 260 may store data units received via ingress interface 220 on behalf of queues 210-1 to 210-3. Memory 260 may be configured to store data units using one or more memory storage units, such as bits, bytes and/or buffers. These memory storage units may be the same as queue storage units or queue threshold units and/or may be different. For example, queue 210 may be configured to operate using queue storage units of bytes for an implementation of network device 130 while memory 260 is configured to use memory storage units of buffers.

Memory 260 may have a state that can be used to determine characteristics of memory 260 at a particular time. For example, memory 260 may have a first state at a first sampling time that indicates 70% of memory 260 is in use. At a second sampling time, memory 260 may have a second state that indicates only 30% of memory 260 is in use. Memory states may be represented in terms of different units, such as bits, bytes, buffers, blocks, etc. consistent with the principles of the invention. Implementations of memory may be used to store data structures associated with managing queues, such as table 270.

Table 270 may include a device, data structure, and/or technique for associating a threshold value with one or more threshold units. For example, table 270 may be implemented as a data structure (as shown in FIG. 3) that includes a number of threshold values arranged in a column format and a corresponding column containing threshold units. Table 270 may be indexed via a device and/or component, such as metering logic 280, to identify an entry in table 270. An entry may include a particular threshold value, such as 1000, and a corresponding threshold unit to use with the threshold value, such as bytes or buffers. For example if an entry contains 1000 for the threshold value and "bytes" for the threshold units, the corresponding threshold value used for evaluating a queue state would be "1000 bytes".

Metering logic 280 may include a device, logic and/or technique for monitoring a state of memory 260. For example, metering logic 280 may be implemented as a register configured to determine how much memory is in use at a given time. Metering logic 280 may take into account the number of queues in use, the fill levels of queues, and/or other parameters when monitoring the state of memory 260. Metering logic 280 may be configured to represent the state of memory 260 using an indicator, or value, such as a meter value and/or a meter reading. In one implementation, metering logic 280 may operate via a four bit register that produces meter values from 0 to 15. These meter values can be used to represent the state of memory 260. For example, metering logic 280 may represent no memory consumption, i.e., 100% of memory 260 is available, as "0." Metering logic 280 may represent full memory consumption, i.e., 0% of memory is available, as "15". Implementations of metering logic 280 may represent memory consumption in a linear fashion and/or a non-linear fashion. Metering logic 280 may represent the state of memory 260 as a unit-less value, as a percentage, and/or as a unit-based value, such as bits, bytes, buffers, etc.

Implementations of metering logic 280 may be programmed by a user via input device 260. For example, a user may program metering logic 280 to have a linear or non-linear range. In addition, the user may determine a range of meter values that cause metering logic 280 to interact with buffer oriented thresholds as opposed to byte oriented thresholds. The user may also set threshold values and/or units using, for example, a data structure that operates a rule that can be indexed by metering logic 280. For example, a user may specify that a meter value of 12 or greater should cause metering logic 280 to use thresholds represented in buffers instead of bytes. The user may further specify that increasing meter values should be associated with correspondingly decreasing threshold values. For example, a meter value of 12 may be associated with a threshold of 100 buffers while a meter valued of 14 may be associated with a threshold value of 75 buffers.

Bus 290 may include a device that permits communication among the components of network device 130.

Exemplary Data Structure

FIG. 3 illustrates an exemplary data structure that can be used to associate a threshold with a queue management unit according to an implementation consistent with the principles of the invention. The data structure of FIG. 3 may be implemented in table 270 and may include threshold value 310, threshold unit 320 (hereinafter unit 320) and entries 330-390.

Table 270 may include computer-readable information arranged in a structure that facilitates associating a threshold value 310 with a unit 320. For example, table 270 may be arranged in an array that includes rows and columns. The row and column format may facilitate interpretation of information contained in table 270 by a user, such as an operator of network device 130. Implementations of table 270 may include information represented as a multidimensional array. For example, in addition to threshold values 310 and units 320, table 270 may include fields and/or entries for other information such as packet priorities, packet colors, packet sizes, queue profiles, congestion parameters, network device loading parameters, queue fill levels, meter readings, and/or service parameters. Therefore, table 270 may take on substantially any form and may include substantially any number and/or type of information/parameters.

Threshold value 310 may include information associated with thresholds that are used to manage queues in network device 130. Threshold value 310 may be associated with queue 210 by, for example, comparing an entry 330-390 to a fill level of queue 210 using a unit 320 that is specified by the particular entry 330-390. For example, a meter value may cause metering logic 280 to access table 270 to identify an entry 330-390. Metering logic 280 may compare a threshold value 310 for a selected entry 330-390 to a current queue state, such as a fill level of queue 210, using a unit 320 that is associated with the selected threshold value 320 from entry 330-390.

Units 320 may include information that can be used to specify a unit that can be used with a threshold value 310 when determining if a queue state of queue 210 can allow a data unit to be placed on queue 210. For example, table 270 may operate with metering logic 280 and memory 260 to provide a threshold value 310 and threshold unit 320 for use in determining if an incoming packet should be placed on queue 210. "Packet" is used in connection with FIG. 3, above, and FIG. 4 below and is representative of a type of data unit that may be used with implementations of the invention. Implementations, such as those described in connection with FIGS. 3 and 4 may also operate with other types of data units consistent with the principles of the invention.

By way of example, assume that queue 210 has a total capacity of 3200 bytes (25 buffers). Further assume that queue 210 currently holds 10 buffers of data, where a buffer is 128 bytes in size. Based on a meter value, metering logic 280 may index to entry 340. Entry 340 may indicate that the threshold value is 5,000 and that units of bytes should be used when comparing the threshold value to a current fill level associated with queue 210. The 10 buffers in queue 210 may be converted to 1280 bytes and compared to the threshold value of 5,000 bytes (entry 340, threshold value=5,000 and units=bytes). Since the fill rate of queue 210 is less than the threshold value, an incoming packet will be placed on queue 210. If the incoming packet is 1280 bytes in size (10 buffers) the fill level of queue 210 will be 20 buffers (2,560 bytes) after the incoming packet in placed on queue 210.

Assume that memory demands on network device 130 have increased after the incoming packet is placed on queue 210. A subsequent packet may arrive at network device 130 and metering logic 280 may index into table 270 to determine a threshold value 310 and unit 320 to compare with a fill rate of queue 210 when processing the subsequent packet. For example, metering logic 280 may index to entry 370 which indicates that a threshold value of 15 should be used and that a unit of buffers should be used. The threshold value/queue fill level comparison can be made as follows: 20 buffers in queue 210 are compared to the threshold of 15 buffers. Since the fill level of queue 210 (20 buffers) exceeds the threshold value (15 buffers) the subsequent packet will not be placed on the queue, i.e. the packet may be dropped.

Exemplary Method

Figure 4:
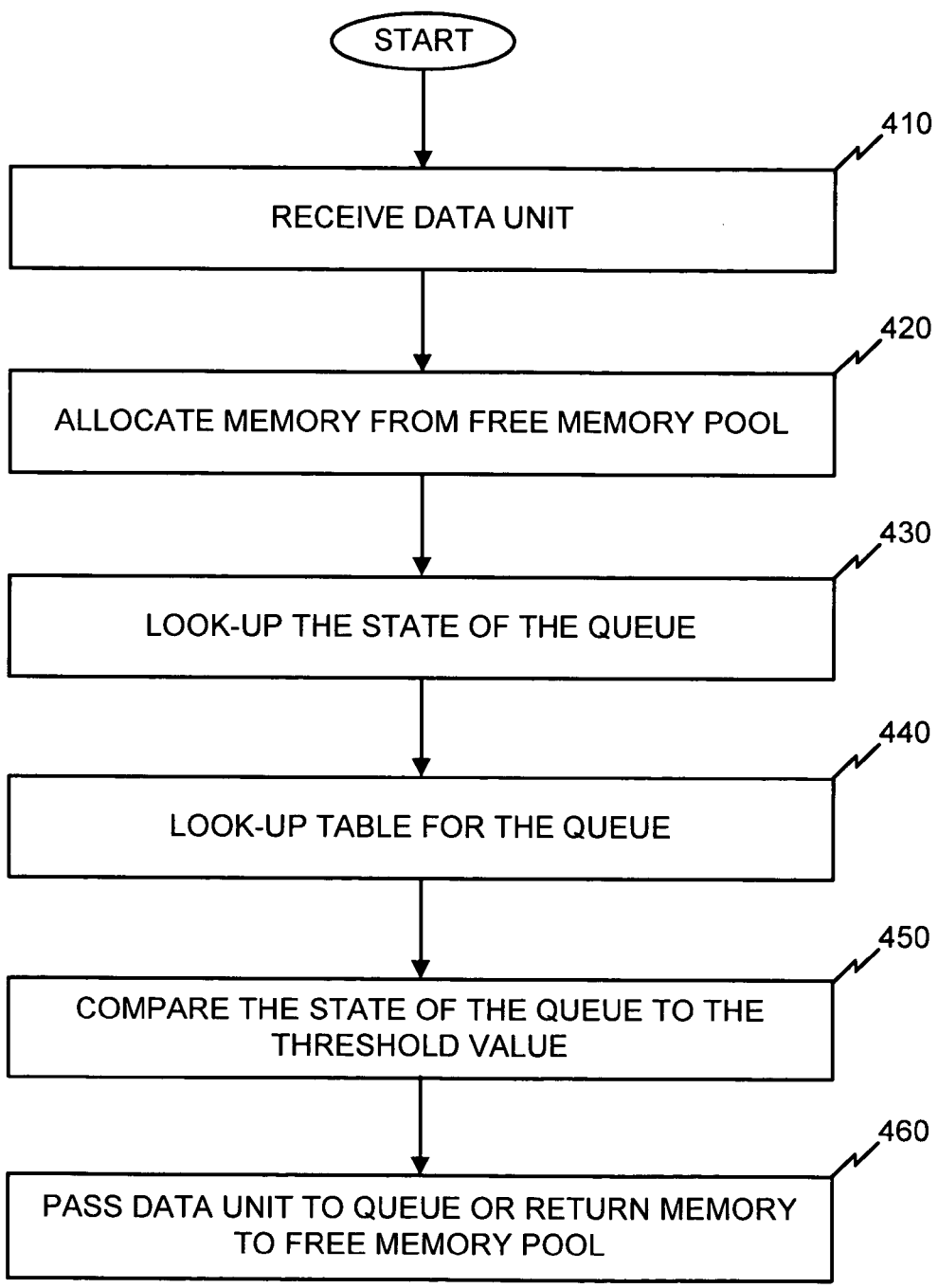
FIG. 4 illustrates an exemplary method for managing a memory that is shared by a group of queues according to an exemplary implementation consistent with the principles of the invention.

FIG. 4 illustrates an exemplary method for managing a memory that is shared by a group of queues according to an exemplary implementation consistent with the principles of the invention.

Processing may begin when a packet is received from network 120 via network device 130 (act 410). For example, network device 130 may receive an incoming packet via ingress queue 220. Network device 130 may allocate memory to the packet from a free pool of memory (act 420). For example, if an incoming packet is 200 buffers (25,600 bytes) in size, network device 130 may allocate 25,600 bytes to the incoming packet if a unit of memory management is bytes and/or may allocate 200 buffers to the incoming packet if memory management is performed in bytes.

Network device 130 may look-up a state of a queue associated with the incoming packet (act 430). For example, the incoming packet may be associated with one of a group of ingress queues 210-1 to 210-3 operating on network device 130. The state of an ingress queue, e.g., queue 210-1, may be determined by looking at a number of buffers and/or bytes in queue 210-1. The state of queue 210-1 may indicate a fill rate associated with that queue. Assume that queue 210-1 has a total capacity of 1000 buffers. Further assume that queue 210-1 has 100 buffers (12,800 bytes) residing therein when the state of queue 210-1 is determined in cooperation with the incoming packet. In this situation, the state, or fill rate, of queue 210-1 is 100 buffers. The size of an incoming packet may not be used when determining the state of queue 210-1, as the size of the incoming packet may not be taken into account when evaluating an existing fill level for queue 210-1.

Implementations may associate a meter value with a state of memory 260. For example, metering logic 280 may access table 270 (act 440). Table 270, as described previously, may include a data structure containing a number of entries, such as entries for threshold values 310 and threshold units 320. Implementations of table 270 may be two dimensional, such as an m×n array, or may be multidimensional depending on configurations of network device 130, memory 260, queues 210 and/or requirements associated with network 120 and/or network device 130. Implementations consistent with the principles of the invention may employ substantially any number of tables 270 and/or configuration of tables 270 for associating a meter value with a threshold value 310, unit 320, and/or queue 210.

Metering logic 280 may select an entry 330-390 from table 270 based on a condition (or state) of memory 260, such as an amount of memory currently in use by queues operating on network device 130. Metering logic 280 may be used to monitor the condition, or state, of memory 260 and may provide a meter value, or reading, indicative of the state of memory 260. For example, metering logic 280 may provide an output ranging from 0 to 15 based on the amount of memory in use. A meter value of 0 may indicate that no memory is in use and a meter value of 15 may indicate that all memory is in use by queues 210 operating on network device 130.

Assume that metering logic 280 has a meter value of "6". The value "6" may be used as an index, or pointer, into a data structure, such as table 270. The index may point to an entry 330 to 390 depending on the meter value. For example, a meter value of "6" may point to entry 360 for a certain state of memory 260 and may point to a different entry, such as entry 380, for a different state of memory 260.

Implementations may associate meter values with characteristics associated with packets, queues, and/or other devices/components operating in network device 130 and/or on network 100. For example, meter values may be a function of packet colors, where the packet colors indicate priorities of the packets. Meter values may also be a function of the types of subscribers serviced by network device 130. For example, a meter value may be associated with a type of service that a subscriber receives (e.g., gold service, bronze service, etc.).

Substantially any number of meters 280 may operate on network device 130 to manage memory 260 and queues 210. For example, a common pool of memory 260 may be shared by two or more meters 280. Assume that memory 260 is monitored by two meters where each meter monitors one half of the available memory. In this configuration, one meter may be operating at a high range (e.g., high meter value) while the other meter is operating at a lower range (e.g., a lower meter value).

Implementations using multiple meters may be configured so that each meter gets a fixed portion of memory and/or a variable portion of memory. For example, if 1 Mbyte of memory is available, a first meter may get a fixed block of 0.25 Mbyte and the second meter may get a fixed block of 0.5 Mbyte. The first and second meters may share the remaining 0.25 Mbyte. The use of multiple meters may allow queues to be divided into subsets, such as ingress queues 210-1 to 210-3 and/or egress queues 210-4 to 210-N. The subsets can be managed using different portions of memory 260 and/or the same portion of memory 260 consistent with the principles of the invention. When multiple meters are used, one meter may have one meter reading while another meter has a different reading.

Implementations using multiple meters may further be configured so as to interact with each other when operating with memory 260. For example, if two meters share a common pool of memory, one meter may have access to a smaller portion of memory because the other meter is using a large portion of memory 260. The two meters may interact so as to have the meter using the large portion of memory use lower thresholds while the meter using less memory uses a higher threshold. The use of a low threshold by the meter using the larger portion of memory may tend to make additional memory resources available to the other meter.

After determining the appropriate entry for rule 270, network device 130 may compare the state of queue 210 to a selected threshold value (act 450). Continuing with the example above, the state of queue 210 is 100 buffers and the threshold value 310 identified via the meter value of "6" is 15,000 bytes (entry 360). Since the state of queue 210 is compared to the threshold value of entry 360 in bytes, 100 buffers will be converted into a number of bytes. The state of queue 210 represented in bytes may be 12,800 (100 buffers× 128 bytes/buffer). Since 12,800 (queue fill rate) is less than the threshold value of 15,000, an incoming packet may be placed in queue 210 regardless of the size of the packet (act 460). If the state of queue 210 was greater than or equal to the threshold value of 15,000, the incoming packet may be dropped. If the incoming packet is dropped, memory allocated to the packet may be returned to the free memory pool so that the memory is available for a subsequently received packet.

Implementations of metering logic 280 may be configured to operate with one or more queue thresholds based on a meter reading. For example, a meter reading of "4" may result in a first threshold value being used for queue 210 while a meter reading of "12" may result in a second threshold value being used for queue 210. Threshold values may take substantially any value and may be represented using various units. In the example above, the first threshold value may be represented in units of bytes and the second threshold value may be represented in units of buffers. The choice of units to associate with a meter reading and/or threshold value may vary with parameters such as an amount of available memory, a number of queues in use, the loading of queues in use, congestion, etc. For example, meter readings indicating a high range of memory consumption, i.e., a lot of memory is in use, may be associated with threshold values represented in buffers while meter readings indicating a low range of memory consumption may be associated with threshold values represented in bytes.

Continuing with the example used above, assume the 200 buffer (25,600 byte) incoming packet is placed on queue 210 since the state of queue 210 (12,800 bytes) was less than the threshold value of 15,000 bytes when the state of the queue 210-1 was examined. Assume that a second packet arrives and acts 510-560 are repeated. Further assume that other queues on network device 130 are being heavily used when the second packet arrives. As a result, memory 260 may be heavily used. The state of queue 210, when the second packet arrives, may be 300 buffers (100 buffers+200 buffers for the first packet placed on queue 210). Metering logic 280 may produce a meter value of "14" based on the current demands of memory 260. The meter value "14" may be used to access an entry in table 270. For example, the meter value of "14" may point to entry 380. Entry 380 may be associated with a threshold value of 200 and a unit of buffers. Since the rule indicates that the state of queue 210 should be compared to the threshold value using buffers, the comparison is as follows: 300 buffers on queue 210 are greater than the threshold value of 200 buffers. Since the state of queue 210 exceeds the threshold value of 200 buffers, the second packet is dropped and the allocated memory for the second packet is returned to the free memory pool.

Implementations consistent with the principles of the invention may manage queues in units of bytes when demands on memory are low. Managing memory in unit of bytes may allow for managing memory in small increments so that greater accuracy is achieved with respect to managing the states of queues 210. Managing memory using bytes may be computationally more demanding than managing memory using buffers; however, when memory demands are low, the additional processing load may be acceptable so that better resolution is achieved with respect to queue fill levels. In contrast, queues may be managed in larger units, such as buffers, when demands on memory become greater than the demands on the memory when bytes are used to manage queues. The use of buffers may not provide as much accuracy as using bytes, but the use of buffers may allow memory management to be fair across all queues in use since a coarse unit of resolution is used. In addition, processing loads associated with managing memory in buffers may be lower than processing loads associated with managing memory in bytes since a buffer may be the unit in which memory is internally managed in network device 130.

CONCLUSION

Systems and methods consistent with the principles of the invention provide techniques for managing memory in devices where the memory needs of queues can exceed available memory. These techniques may dynamically manage memory by varying units of memory management depending on a state of the memory.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIG. 4 the order of the acts may be varied in other implementations consistent with the present invention. Moreover, non-dependent acts may be implemented in parallel.

Also, network and system implementations have been illustrated and described using a single network device, server, client and network. However, in other implementations, networks and systems may include multiple devices and may further include additional devices, such as routers, intrusion detection systems (IDSs), service gateways, proxy servers, and the like. In addition, devices, such as firewalls, may employ multiple interfaces or ports for receiving and sending data units.

While exemplary implementations have been described herein, the processing performed by one of the devices described above may be performed by another device. For example, the processing performed by network device 130 and server 140 may be performed by a single device in alternative implementations. Therefore, implementations consistent with the principles of the invention are not necessarily limited to a particular configuration.

Moreover, it will be apparent to one of ordinary skill in the art that aspects of the invention, as described above, may be implemented in many different forms of software, firmware, and hardware in the implementations illustrated in the figures. The actual software code, or specialized control hardware, used to implement aspects consistent with the principles of the invention is not limiting of the present invention. Thus, the operation and behavior of the aspects were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit, a field programmable gate array or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A device, comprising:
a first memory to:
  store data units;
a second memory to:
  store a first threshold value and a first unit of measure, where the first unit of measure is a byte, and
  store a second threshold value and a second unit of measure, where the second unit of measure is a buffer;
logic to:
  determine a state of the first memory, select the first threshold value and the first unit of measure or the second threshold value and the second unit of measure based on the state of the first memory,
compare the first threshold value to a state of a queue using the first unit of measure when the first threshold value is selected,
store a data unit if the first threshold value is greater than the queue state and the first threshold value is selected,
compare the second threshold value to the state of the queue using the second unit of measure when the second threshold value is selected, and
store the data unit if the second threshold value is greater than the queue state and the second threshold value is selected.

2. The device of claim 1, where the:
logic is further to:
compare the second threshold value to a state of another queue using the second unit of measure when the first threshold value is selected.

3. The device of claim 1, where when determining the state of the first memory, the logic is to:
generate a first value based on the state of the first memory, and
where when selecting the first threshold or the second threshold value, the logic is to:
use the first value to identify an entry in a table that includes the first threshold value and the first unit of measure or the second threshold value and the second unit of measure.

4. A device, comprising:
a first memory to:
store data units;
a second memory to store a table comprising:
a first entry comprising:
a first threshold value, and
a first threshold unit of measure, where the first threshold unit of measure is a byte, and
a second entry comprising:
a second threshold value, and
a second threshold unit of measure, where the second threshold unit of measure is a buffer;
first logic to:
identify a state of the first memory,
generate a value representing the state of the first memory,
use the first entry when the value represents a first state of the first memory, and
use the second entry when the value represents a second state of the first memory where the second state corresponds to a more full state than the first state.

5. The device of claim 4, where the stored data units are associated with a plurality of queues.

6. The device of claim 4, where the first logic is to:
compare the first threshold value to a queue state using the first threshold unit of measure when the first memory is in the first state, and
compare the second threshold value to the queue state using the second threshold unit of measure when the first memory is in the second state.

7. The device of claim 6, where the first logic is to:
store a data unit in the first memory when the queue state is less than the first threshold value when the first memory is in the first state, and
store the data unit in the first memory if the queue state is less than the second threshold value when the first memory is in the second state.

8. The device of claim 4, where the first logic is to:
use an entry having the first threshold unit of measure or the second threshold unit of measure based on the state of the first memory.

9. The device of claim 4, further comprising:
second logic to:
identify a state of a first queue,
use the first entry or the second entry, and
store a first data unit in the first memory if the state of the first queue is less than the threshold value of the entry that is used by the second logic.

10. The device of claim 9, where the first logic is to:
identify a state of a second queue, and
store a second data unit in the first memory if the state of the second queue is less than the threshold value of the entry that is used by the first logic.

11. The device of claim 4, where the first logic is to:
identify a threshold unit based on the state of the first memory, and
identify a table entry based on the selected threshold unit.

12. The device of claim 11, where when identifying a threshold unit, the first logic is to:
identify a first unit of queue management if the state of the first memory has a first value, and
identify a second unit of queue management that is larger than the first unit of queue management if the state of the first memory has a second value.

13. The device of claim 12, where the second value indicates that a greater amount of the first memory is in use as compared to an amount of first memory in use as indicated by the first value.

14. The device of claim 4, where the second entry is used when the second threshold value of the first memory is greater that the first threshold value of the first memory.

15. The device of claim 14, where the first logic to:
generate a range of values that correspond to a range of memory states for the first memory.

16. The device of claim 4, where the first threshold unit of measure is smaller than the second threshold unit.

17. The device of claim 4, where the first memory stores data units associated with a plurality of queues.

18. The device of claim 17, where at least one of the plurality of queues is associated with data traffic or control traffic.

19. The device of claim 4, where the first logic is further to:
use the first entry based on the first state of the first memory or the second entry based on the second state of the first memory, or
use the first entry or the second entry based on criteria associated with one of the data units or criteria associated with the at least one of a plurality of queues.

20. The device of claim 4, where the first and second threshold values are determined in association with a data unit color, a data unit type, a queue profile, or a meter value.

21. A method, comprising:
receiving a data unit;
identifying a state of a memory storing data units;
setting a first threshold measurement unit as bytes;
setting a second threshold measurement unit as buffers;
selecting a threshold value having the first threshold measurement unit or the second threshold measurement unit based on the state of the memory;
comparing the threshold value to a queue state using the first threshold measurement unit if the memory is in a first state;

comparing the threshold value to the queue state using the second threshold measurement unit if the memory is in a second state; and storing the data unit if the queue state corresponds to less than the threshold value.

22. The method of claim 21, where the identifying further comprises:

associating the state of the memory with an indicator;

using the indicator to access a first entry when a first amount of the memory is being used; and using the indicator to access a second entry when a second amount of memory is being used.

23. The method of claim 21, further comprising:

allocating memory to the received data unit in units of bytes when the memory is in the first state; and allocating memory to the received data unit in units of buffers when the memory is in the second state.

24. The method of claim 21, where the selecting further comprises:

accounting for a data unit type, a data unit color, a data unit size, a data unit priority, a queue profile, a register value, a congestion parameter, a loading parameter, or a service parameter when specifying the threshold value.

25. The method of claim 21, further comprising:

selecting another threshold value having the first threshold measurement unit or the second threshold measurement unit; and comparing the other threshold value to another queue state associated with queue using the first threshold measurement unit or the second threshold measurement unit.

26. The method of claim 25, further comprising:

storing another data unit in the memory when the another queue state is less than the another threshold value.

27. The method of claim 21, further comprising:

accessing a table that includes a plurality of threshold values and a plurality of threshold measurement units; and selecting the threshold value from the table.

28. The method of claim 21, further comprising:

allocating one or more buffers to a queue associated with the queue state if the queue state is less than the threshold value.

29. The method of claim 21, further comprising:

managing a plurality of queues based on the state of the memory and the first and second threshold measurement units.

30. A device, comprising:

means for receiving a data unit;

means for identifying a state of a memory storing data units;

means for selecting a threshold value based on the memory state;

means for setting a first threshold measurement unit as bytes;

means for setting a second threshold measurement unit as buffers;

means for associating the first threshold measurement unit or the second threshold measurement unit with the threshold value based on the memory state;

means for comparing the threshold value to a queue fill level using the first unit or the second threshold measurement unit; and means for placing the data unit on the queue if the queue fill level is less than the threshold value.

* * * * *